United States Patent [19]

Curtis

[11] 4,099,538
[45] Jul. 11, 1978

[54] TEMPERATURE-RESPONSIVE SHUT-OFF FOR GAS FUEL REGULATOR VALVE

[75] Inventor: Richard Douglas Curtis, Wichita, Kans.

[73] Assignee: The Coleman Company, Inc., Wichita, Kans.

[21] Appl. No.: 773,858

[22] Filed: Mar. 3, 1977

[51] Int. Cl.² ............................................. F16K 17/38
[52] U.S. Cl. ...................................... 137/73; 137/75; 137/505.42
[58] Field of Search ................................. 137/72–77, 137/505.42; 220/89 B

[56] References Cited

U.S. PATENT DOCUMENTS

| 752,099 | 2/1904 | Palmer | 137/73 |
|---|---|---|---|
| 1,686,875 | 10/1928 | Nelson et al. | 137/73 |
| 1,988,907 | 1/1935 | Lovekin | 137/72 |
| 2,035,497 | 3/1936 | Morse | 137/77 |
| 2,194,541 | 3/1940 | Buttner | 137/73 |
| 2,777,456 | 1/1957 | Ey | 137/505.42 X |
| 3,368,581 | 2/1968 | Glover | 137/72 X |
| 3,384,101 | 5/1968 | Melzer | 137/73 |
| 3,618,627 | 11/1971 | Wagner | 137/73 |
| 3,809,108 | 5/1974 | Hughes | 137/73 |
| 3,911,948 | 10/1975 | Collins et al. | 137/505.42 |
| 3,941,554 | 3/1976 | Curtis | 137/505.42 X |

Primary Examiner—Martin P. Schwadron
Assistant Examiner—Richard Gerard

[57] ABSTRACT

Fusible low-temperature alloy is used to secure a flanged sleeve to an adjusting stem which adjusts the tension on a spring-biased diaphragm which actuates a normally-closed valve. If a predetermined temperature is reached, the alloy melts, displacing the sleeve and removing the compressive force on the spring, thereby closing the valve.

3 Claims, 2 Drawing Figures

TEMPERATURE-RESPONSIVE SHUT-OFF FOR GAS FUEL REGULATOR VALVE

BACKGROUND AND SUMMARY

The present invention relates to regulator valve assemblies for controlling the pressure of gaseous fuel; and more particularly, it relates to a safety shut-off mechanism for a regulator assembly which closes the valve actuated by the regulator when a predetermined temperature is reached.

Propane is a fuel which is widely used in outing and camping products such as catalytic heaters and lanterns, as disclosed in my U.S. Pat. No. 3,941,554, issued Mar. 2, 1976, the disclosure of which is incorporated herein by reference.

A lantern or catalytic heater may be provided with propane from a separate, refillable container, or the burner mechanism may be designed to be mounted directly to a disposable container of propane. In either case, variations in temperature and pressure within the propane reservoir make it desirable to incorporate the pressure regulator between the source and the burner. Such pressure regulators are well known, and as indicated in the reference patent, such regulators include a valve and a spring-biased diaphragm cooperating with the valve to open and close it, thereby regulating the pressure on one side of the diaphragm which is in communication with the burner assembly. Hence, the pressure of the fuel fed to the burner assembly is regulated.

The present invention comprises a safety shut-off for a regulator valve for gaseous fuel; and it includes a valve which is spring-biased to a normally closed position. The valve is located between inlet and outlet ports. Regulation is achieved by a diaphragm assembly biased by a main spring to open and close the valve and thereby regulate the pressure on the outlet side of the valve.

The main spring is compressed against the diaphragm by a threaded adjusting stem. A flanged sleeve is secured to the adjusting stem by fusible low-temperature alloy. If the regulator becomes overheated, the alloy melts at a predetermined temperature, and the flanged sleeve is displaced along the adjusting stem by action of the main spring to thereby remove the force of the spring on the diaphragm and close the valve in shutting off the fuel.

Thus, the present invention is directed to a safe, yet economical and reliable shut-off mechanism for appliances which use gaseous fuel. Further, it has the advantage that it may easily be incorporated into existing structure without substantial retooling or design expenditures.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a vertical cross section view of a regulator valve assembly including the improved safety shut-off, with a fragmentary portion of a fuel source; and FIG. 2 is a view similar to FIG. 1 illustrating the operation of the safety shut-off.

DETAILED DESCRIPTION

Figure 1:
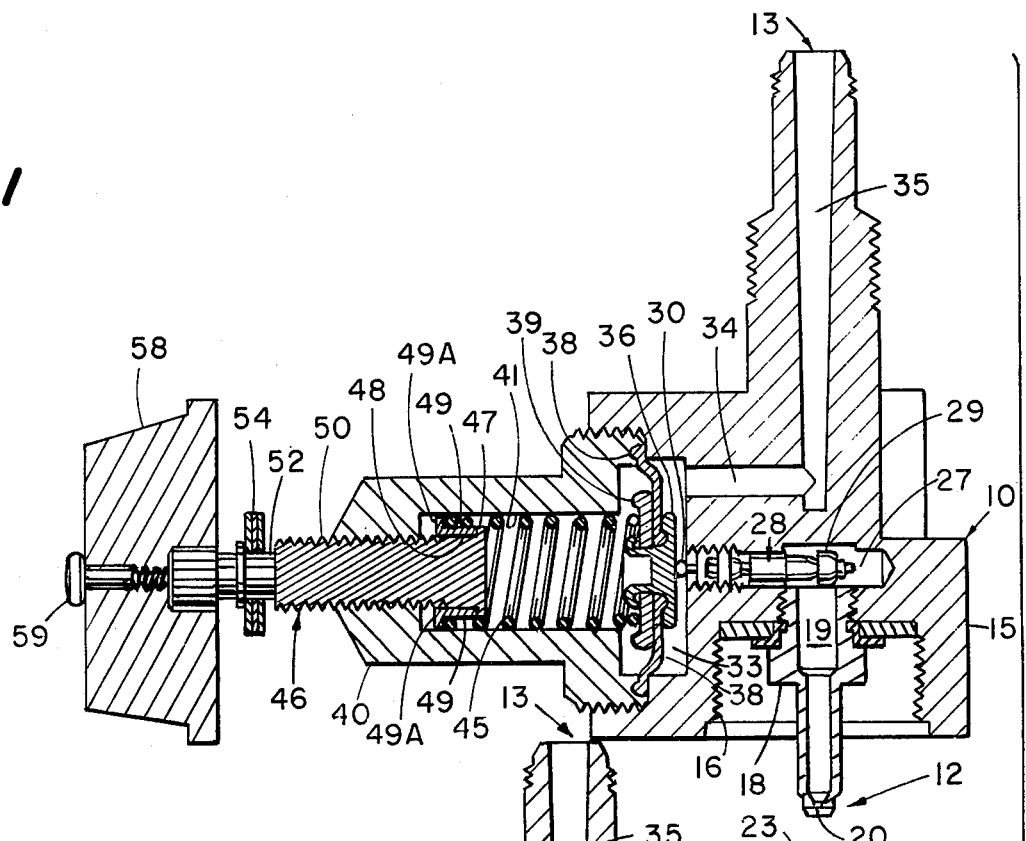

Referring to the drawing, reference numeral 10 generally designates a regulator valve assembly including an inlet 12 and an outlet 13. The inlet 12 is adapted to be coupled to a source of propane generally designated 11, and the outlet 13 is adapted to be connected, for example, to a generator tube (in the case of a lantern) or to the head of a catalytic heater.

The regulator valve assembly 10 includes a regulator body 15 which is threaded at 16 for connecting the corresponding threads on the neck 17 of the source 11. A bottle probe 18 is also threadedly received into the regulator body 15, and it defines a central passage 19 for fuel. The inlet end of the fuel passage 19 is provided with an orifice 20 which acts as a flow limiter for fuel passing from the source 11.

A valve, partially shown at 22 is threadedly received in a central bore 23 of the neck 17; and it includes a valve stem 24 which is depressed (thereby opening the valve 22) by the bottle probe 18 when the source 11 is coupled to the regulator valve assembly. Suitable seals for preventing the escape of fuel are conventionally provided.

When the valve 22 is opened, fuel passes through the orifice 20 through the passageway 19, and then into a transverse passage 27 in which a second valve 28 is located. The valve 28 includes a closure member 29 and a valve stem 30. Both valves 22 and 28 may be conventional tire valves which are spring-biased to the closed position. That is, when the stem 30 is moved to the right in the drawing, the closure member 29 is also moved to the right, thereby permitting fuel to pass through the valve 28. However, a spring within the valve 28 normally urges the stem 30 to the left, thereby closing the valve.

The transverse passageway 27 communicates with a chamber 33 which, in turn, communicates with a passageway 34 and a passageway 35 leading to the outlet 13 which normally provides fuel to a burner assembly, as described. The chamber 33 is partially defined by a diaphragm assembly generally designated by reference numeral 36.

The diaphragm assembly 36 includes a valve depressor 37, a flexible diaphragm 38, and a spring retainer plate 39, all crimped together as a unit by the valve depressor. The periphery of the diaphragm 38 is secured against the valve body 15 adjacent the chamber 33 by means of a spring cage 40 which defines a central bore 41. A main spring 45 is received in the central bore 41 of the spring cage 40. One end of the main spring 45 engages the spring retainer plate 39 of the diaphragm assembly 36, and the other end is received over one end of an adjusting stem generally designated 46.

The adjusting stem 46 includes at its innermost end a peripheral shoulder 47, adjacent which there is a reduced seating portion 48. A sleeve or bushing 49 flanged at 49A is received on the reduced portion 48 of the adjusting stem 46 and secured to it by a fusible low-temperature alloy. The outer diameter of the stem of the flanged sleeve 49 is flush with the peripheral flange 47 of the adjusting stem 46 so that there will be no interference with the spring 45. In one embodiment in which the fusible material is designed to melt at a temperature of approximately 227° F., a bismuth-lead-tin alloy of Arconium Corp. of American of Providence, R.I., sold under the product No. 5298-1 may be used.

The central portion of the adjusting stem 46 is threaded as at 50, and received in corresponding internal threads on the spring cage 40. To the left of the threads 50, a still further reduced portion 52 receives one or more E-rings 54 which are inserted to limit the insertion of the adjusting stem, as disclosed in the above-identified patent. The outboard end of the adjusting stem is knurled or roughened to receive an adjusting knob 58 which is secured by means of a screw 59.

OPERATION

Referring now to FIG. 1, in particular, when the adjusting knob 58 is turned counterclockwise, the valve stem assembly 46 is moved to the right to compress the main spring 45 as the flanged sleeve 49 is also moved to the right. As the spring compresses, the resulting force causes the diaphragm assembly 36 to move toward the valve 28 until the plunger 30 is engaged, translating the sealing cap 29 away from the valve core body and permitting gas to flow through the orifice 20 and passages 19 and 27 into the chamber 33. As pressure builds in the chamber 33, the diaphragm assembly 36 will be forced to the left until the valve 28 closes. The amount of flow is adjustable according to the compression of the main spring 45 which is governed by the adjustment of the valve stem assembly 46. The pressure of the gas fed to the burner is thus regulated for a given flow setting.

Figure 2:
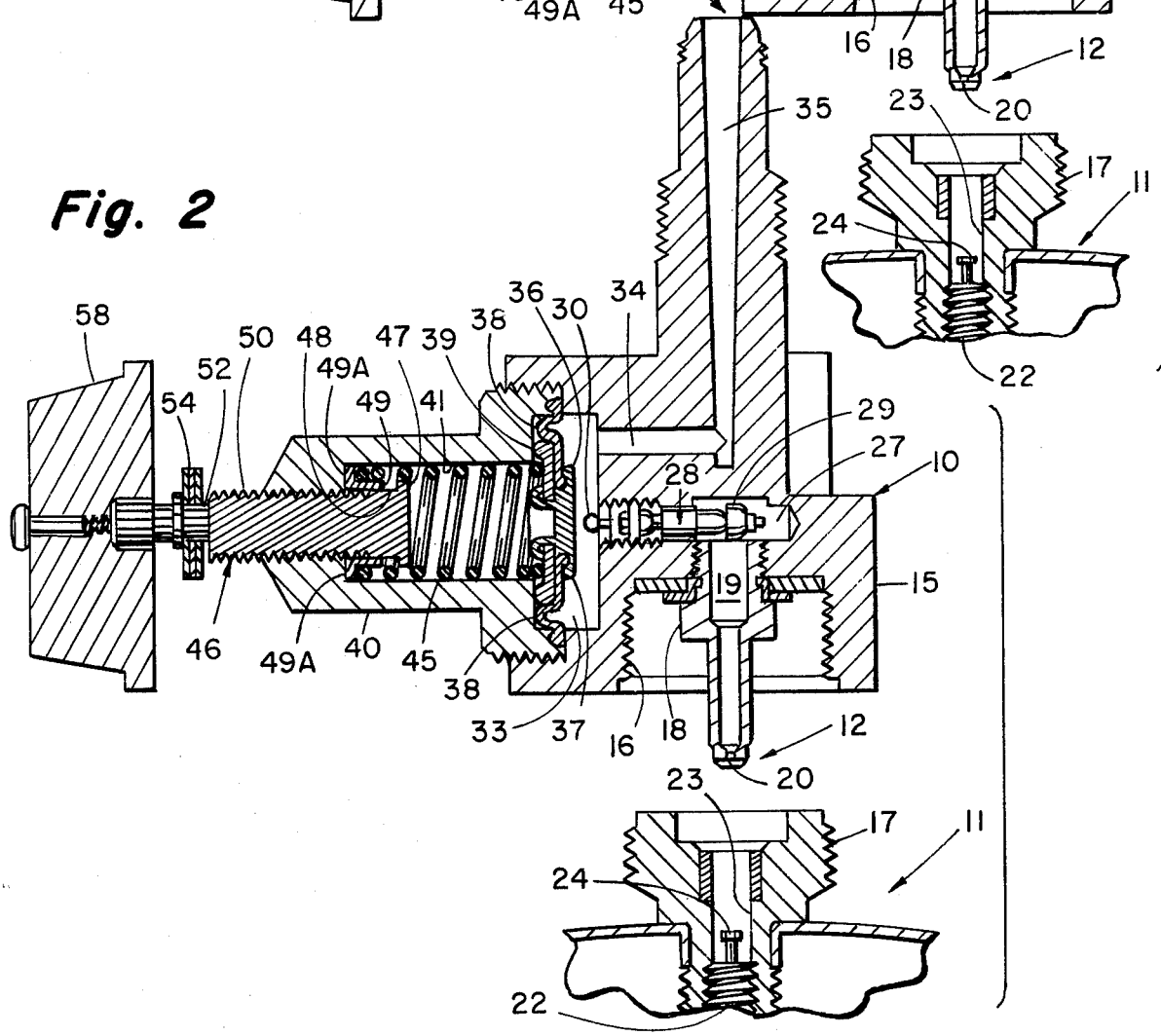

Turning now to FIG. 2, for the same flow setting (i.e., adjustment of the knob 58), if the appliance overheats for any reason, heat is conducted back into the regulator assembly and to the spring housing 40. When the temperature within the housing 40 reaches 227° F., for the illustrated embodiment, the fusible alloy holding the flanged sleeve 49 to the valve stem assembly 46 will melt, and the spring 45 will cause the sleeve to slide off the valve stem assembly and be held against the rear of the spring housing 40. This, in turn, will release the force on the diaphragm assembly 36 and close the valve 28, thereby shutting off the fuel and preventing further operation of the appliance. Thus, the present invention provides a simple and economical, yet reliable safety shut-off for a camping appliance which uses gaseous fuel.

Persons skilled in the art will be able to modify certain of the structure which has been illustrated and to substitute equivalent elements for those disclosed while continuing to practice the principle of the inention; and it is, therefore, intended that all such modifications and substitutions be covered as they are embraced within the spirit and scope of the appended claims.

I claim:

1. In a regulator valve for an appliance using gaseous fuel and having housing means defining inlet and outlet ports, an actuatable valve in said housing means between said ports, a flexible diaphragm assembly adapted to actuate said valve and a spring having one end engaging said diaphragm assembly for urging said diaphragm assembly into operative relation with said valve, an improved shut-off comprising: an adjusting valve stem threadedly received in said housing for longitudinal adjustment; a sleeve mounted about said stem within said housing and displaceable relative to said stem, said sleeve including flange means engaging the other end of said spring for adjusting the compression of said spring as said stem is adjusted; and fusible material meltable at a predetermined temperature securing said sleeve to said stem within said housing; whereby if said temperature is reached, said fusible material will melt and said spring will displace said sleeve relative to said stem to thereby permitting closing of said valve.

2. The apparatus of claim 1 wherein the innermost end of said stem defines a peripheral flange flush with the outer diameter of said sleeve, the stem being received within the coils of said spring.

3. The apparatus of claim 1 wherein said fusible material is an alloy which melts at a temperature of approximately 227° F.

* * * * *